INVENTOR.
ROSS R. SPENCER

United States Patent Office 3,375,585
Patented Apr. 2, 1968

3,375,585
LOADER'S CALCULATING DEVICE
Ross R. Spencer, 5806 Woodward,
Merriam, Kans. 66203
Filed May 9, 1966, Ser. No. 548,556
7 Claims. (Cl. 33—1)

ABSTRACT OF THE DISCLOSURE

A chart plate has lines thereon defining an area representing permissible combinations of weight and center of gravity location for a load carrying vehicle. A vector plate has edge lines suitably scaled and arranged in pairs to vectorially add various loads in combination by indicating a change in point location therealong. By overlapping the plates, it is noted whether the point falls outside the indicated area on the chart plate which would denote an improper vehicle loading.

---

This invention relates to calculating devices and, more particularly, to such devices which are useful for determining permissible combinations of weight and center of gravity in load carriyng vehicles such as aircraft.

The usual methods for determining permissible load and balance conditions in vehicles such as aircraft heretofore involved the separate listing of weight additions to the craft, multiplying such additions separately by their distance to a predetermined datum plane with respect to the craft to find moments, adding the separate columns of weights and moments, and dividing the total moments by the total weight to find the center of gravity location of the loaded craft. The resulting total weight and center of gravity (C.G.) values were then checked against predetermined limits supplied by the manufacturer of the craft. These calculations are sometimes simplified by the use of special charts and/or calculating devices; however, the time and effort normally required is still considerable and the possibility of error relatively great. Particularly difficult for the average person calculating weight and balance is to quickly and accurately determine the optimum changes to be made when the craft is improperly loaded.

The principal objects of the present invention are: to provide a weight and balance calculator for use with load carrying vehicles which is convenient to use; to provide such a calculator which may be constructed to permit rapid computations with any desired accuracy; to provide such a calculating device which permits separate loads to be processed substantially simultaneously; to provide such a device which eliminates the need for tabular calculations and lends itself to quickly finding optimum conditions; to provide such a calculator which handles all computations graphically including vector addition; and to provide such a device which is inexpensive in construction, light in weight, and easily used by a relatively inexperienced person.

Other objects and advantages of this invention will become apparent from the following description taken in connection with the accompanying drawings wherein are set forth by way of illustration and example certain embodiments of this invention.

Figure 1:
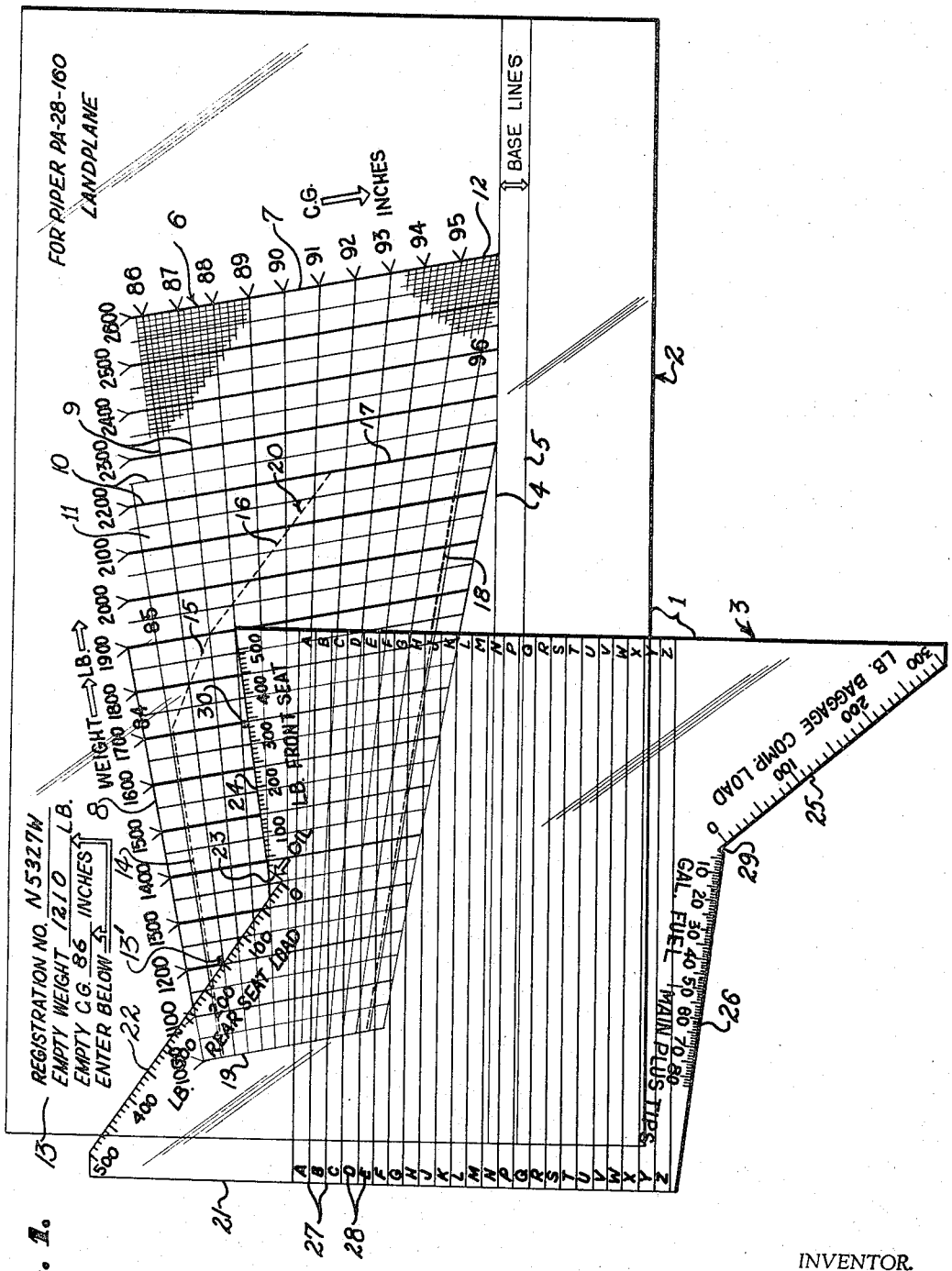
FIG. 1 is a plan view of a chart plate and cooperating vector plate shown in relative positions for simultaneously processing rear seat load, constant oil weight and front seat load.

Referring to the drawings in more detail:

The reference numeral 1 generally indicates a weight and balance calculator embodying this invention. The calculator 1, by way of example, is particularly adapted for calculating weight and balance combinations in a well known class of small aircraft known as Piper PA-28-160 (land) and comprises a chart plate 2 and a vector plate 3.

The chart plate 2 is preferably of sheet plastic which is frosted to accept pencil marks and, in this example, includes printed thereon a pair of parallel base lines 4 and 5 and a graphic chart 6 positioned in predetermined attitudes with respect to each other. The chart 6 has first and second diverging graphic axes respectively designated 7 and 8. The first axis 7, in this example, is scaled in inches from 84 through 96 and indicates variations in distance from an arbitrary datum plane for the aircraft (in this case, 78.4 inches forward of the wing leading edge) to the center of gravity. The second axis 8, in this example, is scaled in pounds from 1000 to 2600 and indicates the total weight of the aircraft from below unloaded to overloaded conditions. The lower end of this weight scale is called a "limit line" only as a practical matter, and is selected to accommodate the lowest empty weight that is likely to exist. Theoretically, the lower end of the weight scale may be extended until all center of gravity location lines converge to a point at zero weight. Intersecting lines 9 and 10 correspond respectively to the divisions on the axes 7 and 8 and form a grid 11 which graphically illustrates all likely combinations of gross weight and center of gravity location, both satisfactory and unsatisfactory, for the particular class of aircraft. In this example, further or subdivisions in the grid 11 are provided by intermediate dividing lines 12 which supply visual aid in extrapolating between the major scale divisions.

Information relating to the specific aircraft in the class to which the chart plate 2 conforms is entered at 13, such information being supplied by the aircraft manufacturer or modifier and including the empty weight and the position of the unloaded center of gravity. This information is further entered graphically on the grid 11 as a semipermanent point 13' which is changed only if the equipment or structure of the aircraft is changed so that the empty weight and/or unloaded center of gravity position is shifted.

The chart plate 2, in this example, includes connecting limit lines 14, 15, 16, 17, 18 and 19 printed on the grid 11 and forming an envelope 20 defining an area on the grid within which all likely and permissible combinations of weight and center of gravity location may be found with reference to the scaled axes 7 and 8. The data necessary to calculate the various points determining the positions of the lines 14–19 is supplied by the aircraft manufacturer or modifier. In this case, the lines 15 and 16 are very slightly curved (not shown on the illustrated scale), and the lines 14, 17, 18 and 19 are straight. The scales chosen for the axes 7 and 8 are suitably expanded and/or contracted to provide the desired resolution.

The vector plate 3, in this example, is in the shape of a transparent or suitably translucent planar polygonal figure 21 having a plurality of edges on the periphery thereof respectively designated 22, 23, 24, 25 and 26. A plurality of parallel indicator lines 27 extend transversely of the plate 3 between the peripheral edges 22–24 and the edges 25–26. The indicator lines 27 may have suitable indicia 28 respectively associated therewith as an aid to help the eye in aligning a selected line 27 with the base lines 4 and 5 on the chart plate 2 as noted hereinafter.

The edges 22–26 are formed in respective groups. The edges 22, 23 and 24 comprise one group in that the edges 22 and 24 each have an end common with opposite ends of the edge 23. The edges 25 and 26 constitute another group in that ends thereof terminate in the area at 29. The actual point of intersection between the edges 25 and 26 is interrupted by cutting away a slight recess at 29 which removes the otherwise intersecting portion of the edge 26. This recess is to provide better access to the zero point on the edge 25 as further discussed below.

The respective edges 22–26 each slope with respect to the indicator lines 27, the slopes being functions of the rate of shift in either a positive or negative direction of the unloaded center of gravity in the aircraft due to the addition of loads at predetermined positions. The respective edges 22, 24, 25 and 26 have scales thereon corresponding to the scale of the grid 11 and over a range including all likely variations in respective loads. The edge 22, in this example, is assigned the rear seat load and is scaled from zero to 500 pounds, the zero point being located slightly upscale from the intersection with the edge 23 in a manner discussed below to provide better access to the said zero point. The edge 23 is assigned the load added by oil in the aircraft, which is assumed to be a constant weight and, therefore, requires no scale. The edges 24, 25 and 26 are respectively assigned front seat load, baggage compartment load and fuel load and appropriate scales are applied thereto for locating positions therealong. As noted hereinafter, the slopes and scale markings associated with the edges 22, 24, 25 and 26 and the effective slope of the edge 23 permit graphic vector additions of proposed load elements in the aircraft when used with the chart plate 2. It is to be understood that the edge 23 has been distorted in length, slope and position from the true representation of oil load to provide the said zero point access on the edge 22. The true oil load edge extends between zero on the edge 22 and zero on the edge 24, the latter being cut off to form the distortion of the edge 23. As explained below, since no reference is made to points along the edge 23 during calculations, no error is introduced due to this edge distortion. Similarly, the recess at 29 removes the unneeded zero portion of the edge 26 to provide better access to the zero on the baggage compartment edge 25.

As noted, the point 13' representing the aircraft center of gravity at empty weight is located in the proper position on the grid 11 corresponding to the axes 7 and 8. By way of operation, the vector plate 3 is overlaid upon the chart plate 2 and placed in proper alignment therewith by obtaining a parallel relationship between the base lines 4 and 5 and the indicator lines 27. While maintaining this relationship, the rear seat load proposed to be added is found on the edge 22 and aligned with the point 13. Referring to FIG. 1, assuming that the rear seat load is 150 pounds, the point on the edge 22 scale corresponding to 150 is placed adjacent the point 13' while maintaining the base lines 4 and 5 and indicator lines 27 parallel to each other. By reference to the zero point on the edge 22, it may be observed that the rear seat load has moved the center of gravity downwardly and to the right on the grid 11, but still well within the limitations shown by the envelope 20. The weight and C.G. position shift for oil is automatically added when reference is made to the front seat load and this addition is independent of the distorted edge 23. In other words, oil is added due to the relative positions between the scaled edges 22 and 24 and no actual reference to either the true or distorted edge 23 is necessary. Assuming that the front seat load is 345 pounds, without moving the plates a point 30 is marked on the plate 2 at the corresponding location on the edge 24 scale. The point 30 graphically represents the weight and center of gravity of the aircraft with rear seat load, oil and front seat load vectorially added together considering their respective proper moments. The point 30 is within the envelope 20 and, therefore, load and balance conditions are acceptable, pending consideration of additional loading. If there is no rear seat load, the zero on the edge 22 is aligned with the point 13' and both oil and front seat load are added by merely finding front seat load on the edge 24 scale.

Figure 2:
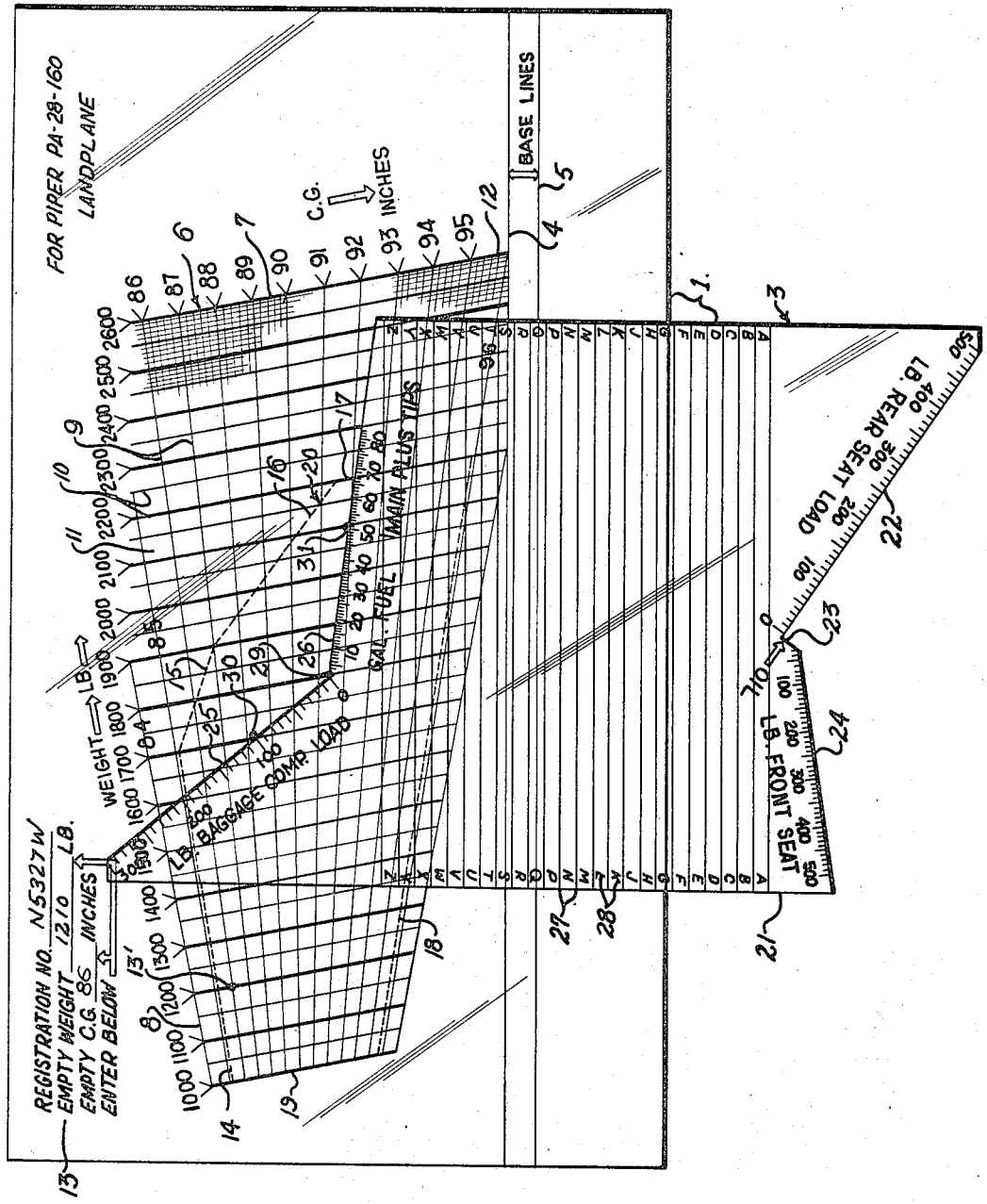
FIG. 2 is a plan view similar to FIG. 1 but showing the vector plate in cooperative position with the chart plate for simultaneously processing baggage compartment load and fuel load while considering the loads processed in connection with FIG. 1.

The vector plate 3 is then rotated 180 degrees and the lines 27 again maintained in parallel relationship with the base lines 4 and 5. Assuming that the baggage compartment load is to be 100 pounds, this designation on the scale associated with the edge 25 is placed adjacent the point 30, FIG. 2. The zero point on the edge 25 now illustrates the aircraft weight and center of gravity position with baggage added to front and rear seat load plus oil load. The fuel load is then added without changing the relationship between the plates 2 and 3 by noting a point 31 on the edge 26 which corresponds to the number of gallons of fuel desired to be carried. If the point 31 falls within the envelope 20, the operator of the aircraft is assured that the aircraft is not overloaded and is acceptably balanced for the load it contains. It is also easily noted graphically that 67 gallons is the maximum amount of fuel which may be carried under the above load conditions, FIG. 2. In this example, tip tanks are necessary to carry over 50 gallons of fuel.

It is apparent from the above that the weight and balance effect of any proposed change in the respective loads can be very easily checked by at least partially repeating the above procedures with the new value.

It is to be understood that while one form of this invention has been illustrated and described, it is not to be limited thereto except insofar as such limitations are included in the following claims.

What I claim and desire to secure by Letters Patent is:

1. A weight and balance calculator for use with load carrying vehicles comprising:
   (a) a chart plate and a vector plate in overlying relationship,
   (b) said chart plate including a base line and a graphic chart related to said base line, said chart comprising limit lines forming an envelope defining an area representing permissible combinations of weight and center of gravity location in said vehicle,
   (c) said vector plate comprising a plurality of edges and an indicator line thereon related to said edges, said edges having respective load scale markings therealong corresponding to the scale of said chart, said edges each extending at predetermined slopes with respect to said indicator line, said slopes and scale markings being selected to display vector additions of proposed loads upon combining said vector plate in sliding overlaying relationship with said chart plate while said indicator line extends parallel to said base line.

2. The calculator as set forth in claim 1 wherein:
   (a) at least two of said edges are connected whereby two loads are simultaneously calculated graphically.

3. The calculator as set forth in claim 1 wherein:
   (a) said chart includes a scaled grid associated with said envelope and displaying numerical values for combinations of weight and center of gravity location.

4. The calculator as set forth in claim 1 wherein:
   (a) said vector plate is transparent for observing said chart therethrough.

5. The calculator as set forth in claim 1 wherein:
   (a) said base lines constitute a plurality of parallel lines.

6. The calculator as set forth in claim 1 wherein:
   (a) said indicator line constitutes a plurality of parallel lines.

7. A weight and balance calculator for use with a load carrying vehicle comprising:
   (a) a chart plate and a vector plate in overlying relationship,
   (b) said chart plate including a base line and limit lines related to said base line, said limit lines at least partially forming a scaled envelope representing an area of permissible combinations of weight and center of gravity location in said vehicle, (c) said vector plate having a plurality of edge lines and parallel indicator lines thereon, said edge lines being positioned in pairs and having respective load scale markings therealong corresponding to the scale of said envelope, said edge lines extending at respective predetermined slopes with respect to said indicator lines, said slopes and scale markings displaying vector additions of proposed load elements in said aircraft when said vector plate and chart plate overlap and said indicator lines extend parallel to said base line.

References Cited

UNITED STATES PATENTS

| | | | |
|---|---|---|---|
| 1,429,463 | 9/1922 | Squyer | 33—1.5 |
| 2,247,531 | 7/1941 | Thurston et al. | 33—1.5 |
| 2,365,494 | 12/1944 | Schlieben et al. | 33—1.5 |
| 2,432,738 | 12/1947 | Fairbanks | 235—61.03 X |
| 2,561,794 | 7/1951 | Gurney | 33—1.5 |
| 3,012,715 | 12/1961 | Saunders | 235—61.03 |

WILLIAM D. MARTIN, Jr., *Primary Examiner.*